United States Patent
Zaki et al.

(10) Patent No.: US 10,560,237 B2
(45) Date of Patent: Feb. 11, 2020

(54) CELL-SPECIFIC REFERENCE SIGNAL TRANSMISSIONS FOR EVOLVED MACHINE TYPE COMMUNICATION

(71) Applicant: QUALCOMM Incorporated, San Diego, CA (US)

(72) Inventors: Ahmed Zaki, Bengaluru (IN); Gowrisankar Somichetty, Bangalore (IN); Shashidhar Vummintala, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/961,329

(22) Filed: Apr. 24, 2018

(65) Prior Publication Data
US 2018/0351714 A1 Dec. 6, 2018

Related U.S. Application Data

(60) Provisional application No. 62/512,525, filed on May 30, 2017.

(51) Int. Cl.
  *H04W 4/00* (2018.01)
  *H04L 5/00* (2006.01)
  *H04W 72/08* (2009.01)
(52) U.S. Cl.
  CPC ......... *H04L 5/0048* (2013.01); *H04W 72/085* (2013.01)
(58) Field of Classification Search
  None
  See application file for complete search history.

(56) References Cited

U.S. PATENT DOCUMENTS 9,461,766 B2  10/2016  Yi et al.
9,602,258 B2  3/2017  Kim et al.
(Continued)

OTHER PUBLICATIONS

Ericsson: "Frequency domain CRS muting for MTC," 3GPP Draft; R1-1705194—Frequency Domain CRS Muting for MTC, 3rd Generation Partnership Project (3GPP), Mobile Competence Centre; 650, Route Des Lucioles; F-06921 Sophia-Antipolis Cedex; France, vol. RAN WG1, no. Spokane; Apr. 3, 2017-Apr. 7, 2017, Apr. 2, 2017, XP051243326, 3 pages, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Elisabeth Benoit Magloire
(74) *Attorney, Agent, or Firm* — Arent Fox LLP

(57) ABSTRACT

The present disclosure provides reduced cell-specific reference signal (CRS) transmissions for evolved machine type communication (eMTC). In one aspect, a network entity may determine at least one narrow band for transmission of a CRS. The network entity may further identify one or more resource blocks proximate the at least one narrow band and transmit the CRS on the narrow band and the one or more proximate resource blocks to a UE. In another aspect, a UE may apply a receive window to filter one or more noise samples outside at least one narrow band allocation, the receive window corresponding to one or more resource blocks located outside the defined number of resource blocks of the at least one narrow band allocation. The UE may further receive the CRS within the at least one narrow band allocation from a network entity in response to applying the receive window.

30 Claims, 14 Drawing Sheets

(56) References Cited

U.S. PATENT DOCUMENTS

| | | | |
|---|---|---|---|
| 10,404,348 B2* | 9/2019 | Yum | H04L 5/0048 |
| 2016/0234856 A1 | 8/2016 | Xu et al. | |
| 2016/0295374 A1 | 10/2016 | Persson et al. | |
| 2017/0026863 A1* | 1/2017 | Wang | H04W 4/70 |
| 2017/0064685 A1 | 3/2017 | Rico et al. | |
| 2017/0238298 A1* | 8/2017 | Wang | G01S 5/0236 |
| | | | 455/452.1 |
| 2017/0238306 A1* | 8/2017 | Patel | H04B 7/0632 |
| | | | 370/329 |
| 2017/0311189 A1* | 10/2017 | Almalfouh | H04B 17/336 |
| 2018/0069612 A1* | 3/2018 | Yum | H04L 1/00 |
| 2018/0279257 A1* | 9/2018 | Dai | H04W 48/10 |

OTHER PUBLICATIONS

International Search Report and Written Opinion—PCT/US2018/029442—ISA/EPO—Jul. 26, 2018 13 pages.

Qualcomm Incorporated: "Frequency Domain CRS Muting," 3GPP Draft; R1-1705014 Frequency Domain CRS Muting, 3rd Generation Partnership Project (3GPP), Mobile Competence Centre; 650, Route Des Lucioles; F-06921, Sophia-Antipolis Cedex; France, vol. RAN WG1, no. Spokane, Washington, USA; Apr. 3, 2017-Apr. 7, 2017, Apr. 2, 2017, XP051243145, 3 pages, Retrieved from the Internet: URL: http://www.3gpp.org/ftp/Meetings_3GPP_SYNC/RAN1/Docs/ [retrieved on Apr. 2, 2017].

Sony: "Frequency Domain CRS Muting for efeMTC," 3GPP Draft; R1-1705206 CRS-Muting, 3rd Generation Partnership Project (3GPP), Mobile Competence Centre; 650, Route Des Lucioles; F-06921 Sophia-Antipolis Cedex; France, vol. RAN WG1, no. Spokane, USA; Apr. 3, 2017-Apr. 7, 2017, Apr. 2, 2017, XP051243337, 4 pages, Retrieved from the Internet: URL: http://www.3gpp.org/ftp/Meetings_3GPP_SYNC/RAN1/Docs/ [retrieved on Apr. 2, 2017].

* cited by examiner

CELL-SPECIFIC REFERENCE SIGNAL TRANSMISSIONS FOR EVOLVED MACHINE TYPE COMMUNICATION

CROSS-REFERENCE TO RELATED APPLICATION(S)

This application claims the benefit of U.S. Provisional Application Ser. No. 62/512,525, entitled "CELL-SPECIFIC REFERENCE SIGNAL TRANSMISSIONS FOR EVOLVED MACHINE TYPE COMMUNICATION" and filed on May 30, 2017, which is expressly incorporated by reference herein in its entirety.

BACKGROUND

Aspects of the present disclosure relate generally to wireless communication networks, and more particularly, to transmissions of cell-specific reference signals (CRS) in an evolved machine type communication (eMTC) environment.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, reduced CRS may inhibit a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a network entity. The described aspects may include determining at least one narrow band for transmission of a cell-specific reference signal (CRS) to a user equipment (UE). The described aspects may further include identifying one or more resource blocks proximate the at least one narrow band. The described aspects may further include transmitting the CRS on the narrow band and the one or more proximate resource blocks to the UE.

In another aspect, a network entity comprises a memory and at least one processor in communication with the memory. The at least one processor may be configured to determine at least one narrow band for transmission of a CRS to a UE. The at least one processor may further be configured to identify one or more resource blocks proximate the at least one narrow band. The at least one processor may further be configured to transmit the CRS on the narrow band and the one or more proximate resource blocks to the UE.

In an additional aspect, a network entity for wireless communications may include means for determining at least one narrow band for transmission of a CRS to a UE. The network entity may further include means for identifying one or more resource blocks proximate the at least one narrow band. The network entity may further include means for transmitting the CRS on the narrow band and the one or more proximate resource blocks to the UE.

In yet another aspect, a computer-readable medium storing computer code executable by a processor for wireless communications at a network entity may determining at least one narrow band for transmission of a CRS to a UE. The computer-readable medium may further include code for identifying one or more resource blocks proximate the at least one narrow band. The computer-readable medium may further include code for transmitting the CRS on the narrow band and the one or more proximate resource blocks to the UE.

In an aspect, the present disclosure includes a method for wireless communications at a user equipment. The described aspects may include receiving at least one narrow band allocation corresponding to a number of resource blocks allocated for CRS reception. The described aspects may further include applying a receive window to filter one or more noise samples outside the at least one narrow band allocation, the receive window corresponding to one or more resource blocks located outside the defined number of resource blocks of the at least one narrow band allocation. The described aspects may further include receiving the CRS within the at least one narrow band allocation from a network entity in response to applying the receive window.

In another aspect, a UE comprises a memory and at least one processor in communication with the memory. The at least one processor may be configured to receive at least one narrow band allocation corresponding to a number of resource blocks allocated for CRS reception. The at least one processor may further be configured to apply a receive window to filter one or more noise samples outside the at least one narrow band allocation, the receive window corresponding to one or more resource blocks located outside the defined number of resource blocks of the at least one narrow band allocation. The at least one processor may further be configured to receive the CRS within the at least one narrow band allocation from a network entity in response to applying the receive window.

In an additional aspect, a UE may include means for receiving at least one narrow band allocation corresponding to a number of resource blocks allocated for CRS reception. The UE may further include means for applying a receive window to filter one or more noise samples outside the at least one narrow band allocation, the receive window corresponding to one or more resource blocks located outside the defined number of resource blocks of the at least one narrow band allocation. The UE may further include means for receiving the CRS within the at least one narrow band allocation from a network entity in response to applying the receive window.

In yet another aspect, a computer-readable medium storing computer code executable by a processor for wireless communications at a UE may include code for receiving at least one narrow band allocation corresponding to a number of resource blocks allocated for CRS reception. The computer-readable medium may further include code for applying a receive window to filter one or more noise samples outside the at least one narrow band allocation, the receive window corresponding to one or more resource blocks located outside the defined number of resource blocks of the at least one narrow band allocation. The computer-readable medium may further include code for receiving the CRS within the at least one narrow band allocation from a network entity in response to applying the receive window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
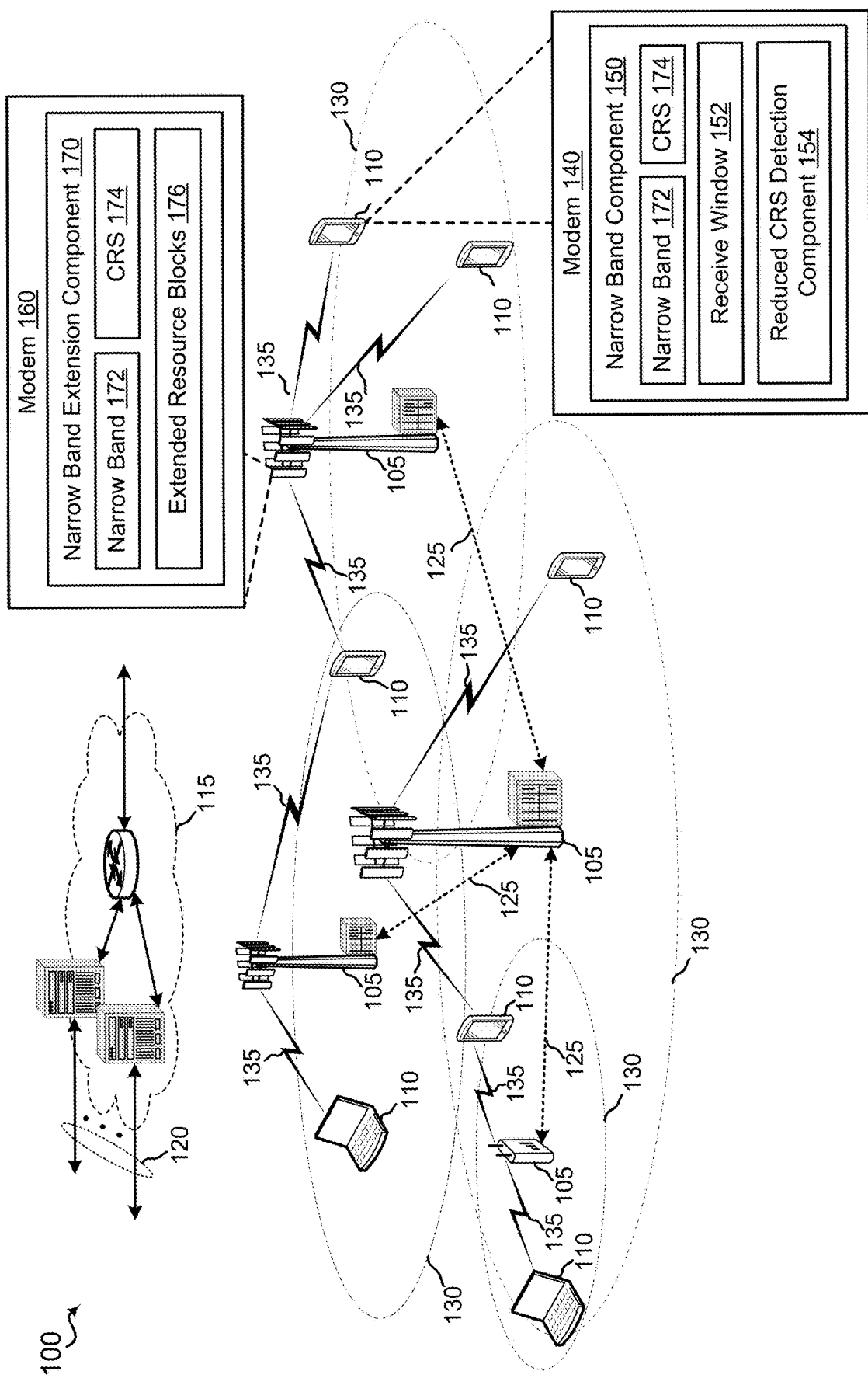
FIG. 1 is a schematic diagram of an example of a wireless communication network including at least one base station having narrow band extension component and at least one user equipment (UE) having a narrow band component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to cell-specific reference signal (CRS) transmissions in an evolved machine type communication (eMTC) system. Specifically, a network entity may transmit a CRS on a downlink communication channel to a user equipment (UE) within a narrow band allocation. The UE may utilize the received CRS for cell search and/or initial acquisition, downlink channel estimation for coherent demodulation/detection at the UE, and/or downlink channel quality measurements. In some eMTC networks, CRS transmissions may be reduced to specific narrow bands corresponding to a number of resource blocks so as to reduce interference between adjacent cells, for example. In an eMTC network, for instance, a UE may monitor CRS on at least one configured or scheduled narrow band. Further, on the subframes where the UE may potentially monitor MTC physical downlink control channel (MPDCCH) and/or the physical downlink shared channel (PDSCH), the network may mute the CRS outside the region of interest, or more specifically, outside the narrow bands. However, by reducing CRS transmissions (e.g., or the bandwidth available for CRS transmissions), UEs that typically process the CRS over an entire bandwidth may potentially experience performance degradations when receiving CRS transmissions from a network entity. Hence, mitigation of performance degradation as a result of CRS reductions may be desirable in eMTC systems.

As such, the present aspects may provide CRS transmissions in eMTC systems. For example, in an aspect, a network entity may determine at least one narrow band for transmission of a CRS to a UE. The network entity may further identify one or more resource blocks proximate to the at least one narrow band and transmit the CRS on the narrow band and the one or more proximate tp resource blocks to the UE. Additionally, in an aspect, a UE may receive at least one narrow band allocation corresponding to a number of resource blocks allocated for CRS reception. Further, the UE may apply a receive window to filter one or more noise samples outside the at least one narrow band allocation and receive the CRS within the at least one narrow band allocation from a network entity.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include at least one UE 110 with a modem 140 having a narrow band component 150 that may apply a receive window 152 to filter out noise samples outside the narrow band 172 and/or a central number of resource blocks. In other words, to address the performance gap (e.g., especially at very low signal-to-noise ratios (SNR)) between the UE 110 processing over a reduced or narrow bandwidth and the UE 110 processing the full system bandwidth, the noise samples from the remaining bandwidth may be detected and filtered out when receiving a CRS 174 on a narrow band 172.

Additionally, the narrow band component 150 may be configured, via a reduced CRS detection component 154, to detect a reduced CRS 174 transmission from the base station 105. For example, in an aspect, the CRS detection component 154 may be configured to perform time domain processing for one or more narrow bands located outside the narrow band 172 of interest and/or the central resource blocks to detect whether CRS 174 muting is applied. In another aspect, the CRS detection component 154 may be configured to determine, semi-statically, whether the base station 105 (or network) has deployed reduced CRS 174 transmissions.

Wireless communication network 100 may also include at least one base station 105 with a modem 160 having a narrow band extension component 170 that may allocate extended resource blocks 176 for CRS 174 transmissions on the narrow band 172 as well as the extended resource blocks 176. That is, to improve the CRS processing gain for channel estimation, the narrow band extension component 170 may allocate the extended resource blocks 176 to one or both sides of the narrow band 172 for CRS 174 transmissions on a wider range of resource blocks.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2A:
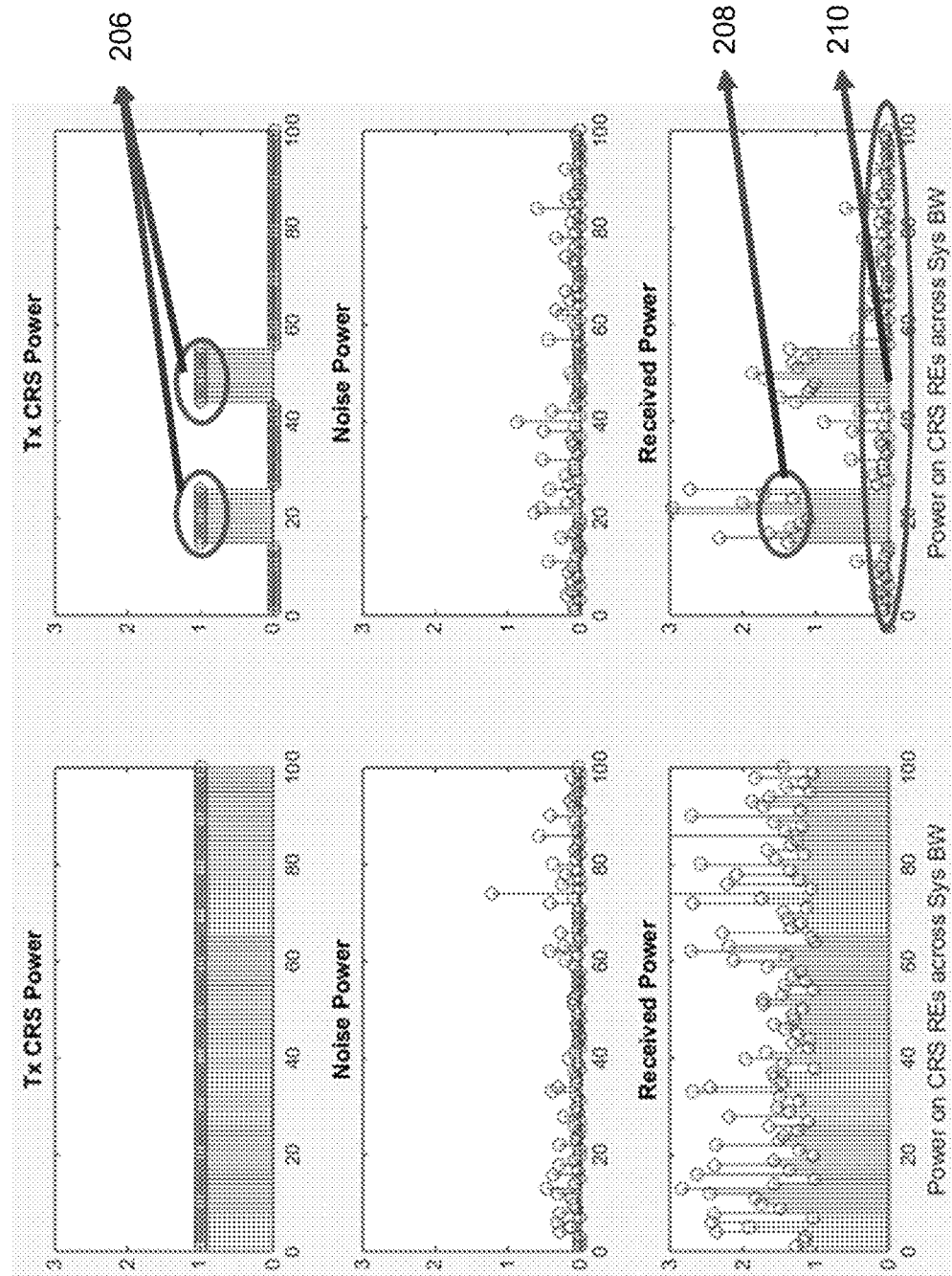
FIG. 2A is a graphical diagram of a power comparison for cell-specific reference signal (CRS) transmission over full bandwidth compared to reduced CRS (or narrow bandwidth)

FIG. 2A is a graphical diagram of a power comparison for CRS transmission over full bandwidth compared to reduced CRS (or narrow bandwidth). The left column includes graphical representations of transmit CRS power, noise power, and received power for transmission of CRS over full bandwidth 202. The right column includes transmit CRS power, noise power, and received power for transmission of reduced CRS 204. In the illustrated aspects, transmission of CRS over full bandwidth 202 is generally made at a consistent power level across the system bandwidth. However, with reduced CRS 204 transmissions, the transmit CRS power is correspondingly reduced, yet the noise power and the corresponding noise in the received power (e.g., for a UE) may indicate the presence of narrow bands in resource blocks where such narrow bands do not exist. For example, at 206, the system bandwidth may be 50 resource blocks, and the network may transmit CRS over a central 6 resource blocks and eMTC on a first narrow band. At 208, a typical UE may be interested in the first narrow band and may process the CRS from these resource elements. However, at 210, there may be UEs that monitor a complete system bandwidth including the noise samples from other resource elements, resulting in performance degradations.

Figure 2B:
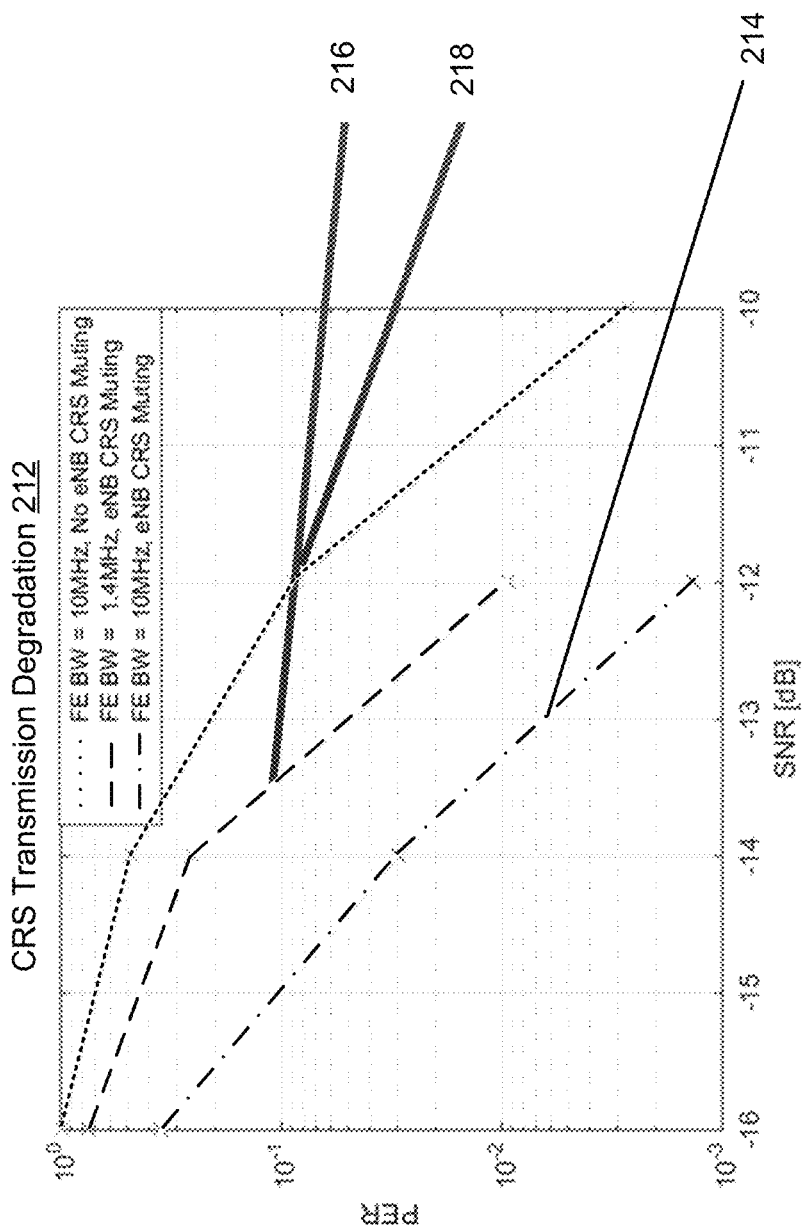
FIG. 2B is a graphical diagram of CRS transmission degradation in performance as a result of CRS muting.

FIG. 2B is a graphical diagram of CRS transmission degradation 212 in performance as a result of CRS muting. The line 214 representing a 10 MHz front-end (FE) bandwidth with no network entity (e.g., eNB) CRS muting may be considered as a baseline. The FE bandwidth may be the bandwidth over which the UE 110 monitors/processes the resource blocks. Two examples of CRS muting are shown by lines 216 and 218. The line 216 shows a 10 MHz FE bandwidth having network entity (e.g., eNB) CRS muting. The line 216 demonstrates a performance degradation of approximately 3 dB at 10% packet error rate (PER). The line 218 shows a 1.4 MHz FE bandwidth having network entity (e.g., eNB) CRS muting. The line 218 demonstrates a performance degradation of approximately 1.5 dB at 10% PER. As such, CRS muting by the network entity (e.g., eNB) may introduce higher levels of noise received or detected at the UE.

Figure 2C:
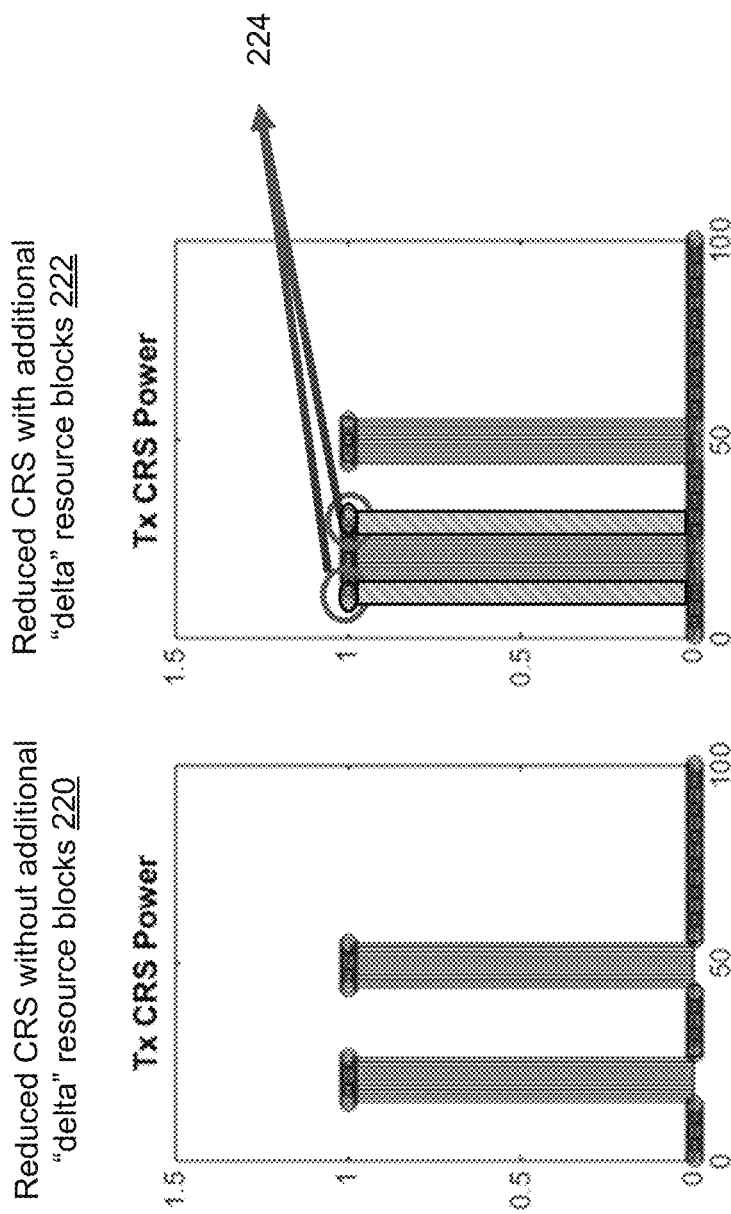
FIG. 2C is a graphical diagram of reduced CRS without an additional 'delta' number of resource blocks compared to reduced CRS with the additional number of 'delta' resource blocks.

FIG. 2C is a graphical diagram of reduced CRS without an additional 'delta' number of resource blocks 220 compared to reduced CRS with the additional number of 'delta' resource blocks 222. Specifically, to address the performance degradations as shown and described herein with respect to FIG. 2B, the network entity may not only transmit the reduced CRS on the assigned narrow band, but also an additional number of 'delta' resource blocks 224 on one or both adjacent sides of the narrow band. For the reduced CRS with the additional number of 'delta' resource blocks 222, the system bandwidth may be 50 resource blocks where the network entity may transmit the CRS over a central 6 resource blocks and an eMTC at a first narrow band. The network entity may also transmit the CRS over or on three additional resource blocks on either side of the first narrow band. For example, instead of transmitting the CRS on just the narrow band of interest, the network entity (e.g., eNB) may extend the CRS transmission by 'delta' number of resource blocks on one or both sides of the narrow band. By providing additional resource blocks adjacent to the narrow band, the CRS processing gain for channel estimation may be improved, and measurement accuracies of covariance matrix (Rnn), frequency tracking loop (FTL), and time tracking loop (TTL) may be improved.

In some aspects, the 'delta' number of resource blocks may be dependent on a network implementation. For example, the 'delta' number of resource blocks may be a pre-determined value. Further, in some aspects, the 'delta' number of resource blocks may depend on a power factor. In some aspects, the 'delta' number of resource blocks may be different on either side of the narrow band. For instance, this may occur on the edges of the bandwidth where additional resource blocks are available on only one of the sides. In other scenarios, the additional resource block allocation may be symmetrical.

Figure 2D:
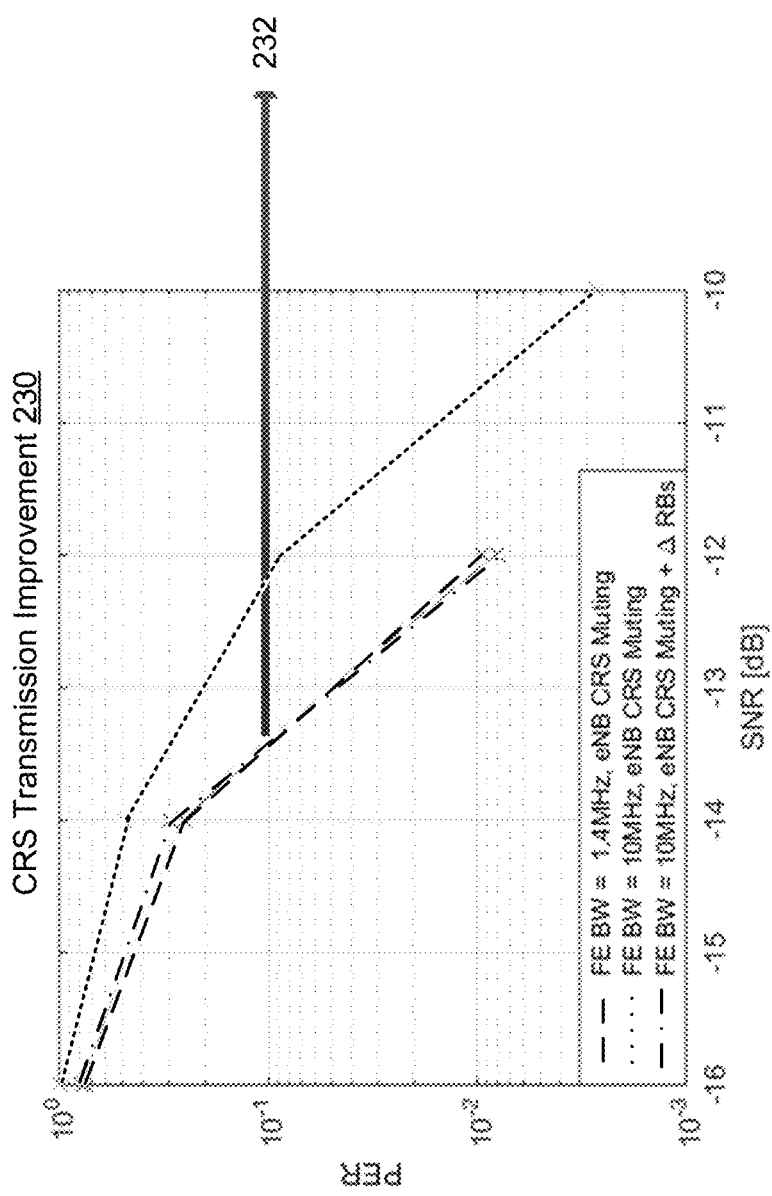
FIG. 2D is a graphical diagram of the performance improvement for reduced CRS having the extended number of resource blocks.

FIG. 2D is a graphical diagram of the performance improvement 232 for reduced CRS having the extended number of resource blocks. For example, the performance improvement 232 may be obtained with the additional 'delta' number of resource blocks at the network entity (e.g., eNB) with the CRS muting. Specifically, for the 10 MHz FE bandwidth, the performance gain may be approximately 1.5 dB at 10% PER with respect to no additional 'delta' number of resource blocks added by the network entity. Additionally, the performance gain is comparable to the 1.4 MHz FE bandwidth.

Figure 2E:
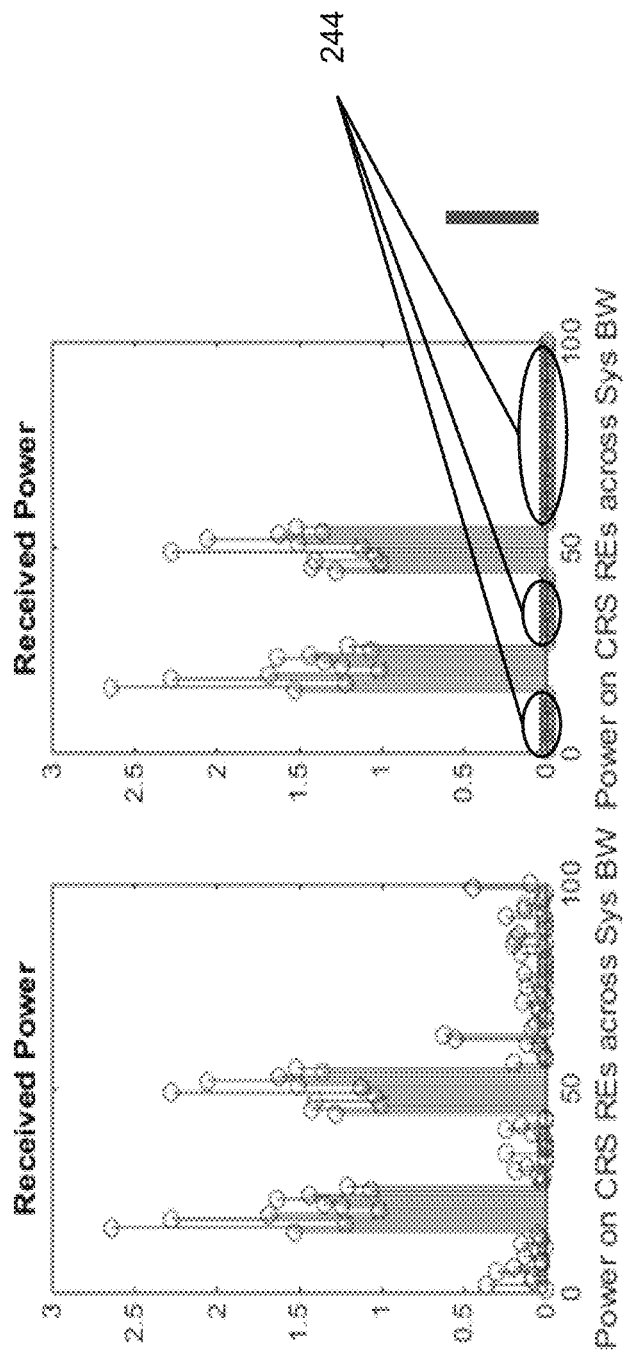
FIG. 2E is a graphical diagram of a UE operation system bandwidth without windowing compared to with windowing.

FIG. 2E is a graphical diagram of a UE operation system bandwidth without windowing compared to with windowing. A performance gap may be seen (e.g., especially at very low SNRs) between a UE processing over 1.4 MHz bandwidth and a UE processing full system bandwidth (e.g., a loss of 1.5 dB may be seen in FIG. 2B). In order to close this gap, a UE may switch to the 1.4 MHz bandwidth and filter out the noise from the rest of the bandwidth. However, such procedure may underutilize the potential performance gain when the network does not employ reduced bandwidth (e.g., no gain of 1.5 dB in FIG. 2B). For instance, a power on the CRS resource elements across the system bandwidth is shown for a UE operation using the system bandwidth without windowing 240. Additionally, a power on the CRS resource elements across the system bandwidth is shown for a UE operation using the system bandwidth with windowing 242. With windowing, a UE may apply a receive window so as to filter out noise samples 244 outside the narrow band of interest and a central six (6) resource blocks. Compared to the 1.4 MHz system bandwidth, the CRS processing gain may increase by at least 1.75 dB (e.g., factor of 18/12). If the network provides an additional 'delta' resource blocks on either side of the narrow band of interest, then the CRS processing gain may be at least 3 dB (e.g., factor of 24/12).

Figure 2F:
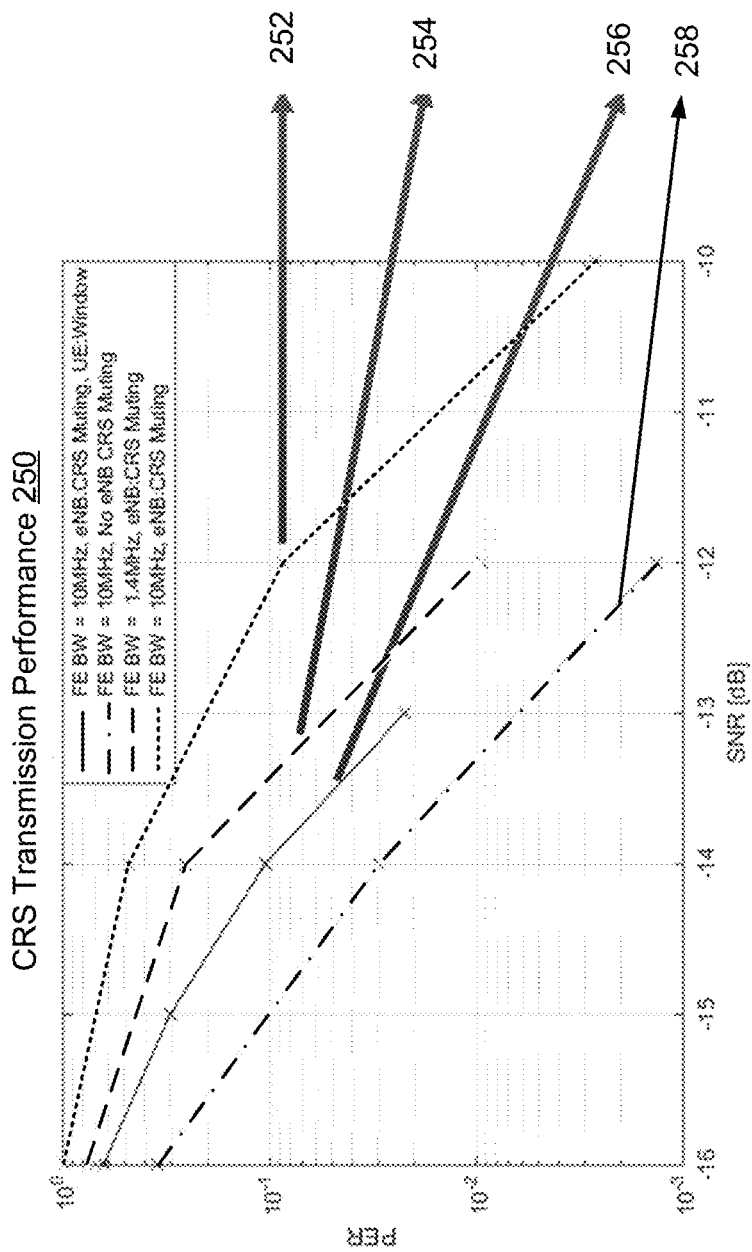
FIG. 2F is a graphical diagram of the CRS transmission performance along multiple bandwidths including at least one with windowing.

FIG. 2F is a graphical diagram of the CRS transmission performance 250 along multiple bandwidths including at least one with windowing. For example, a line 258 representing a 10 MHz FE bandwidth with no network entity (e.g., eNB) CRS muting may achieve the best possible performance at the UE. A line 252 representing a 10 MHz FE bandwidth with network entity (e.g., eNB) CRS muting demonstrates a performance degradation of 3 dB at 10% PER. Further, a line 254 representing a 1.4 MHz FE bandwidth with network entity (e.g., eNB) CRS muting may demonstrate a performance degradation of 1.5 dB at 10% PER. However, with windowing at the UE and retaining the FE bandwidth to 10 MHz, the performance degradation may be reduced to 1 dB, as shown by line 256.

Figure 2G:
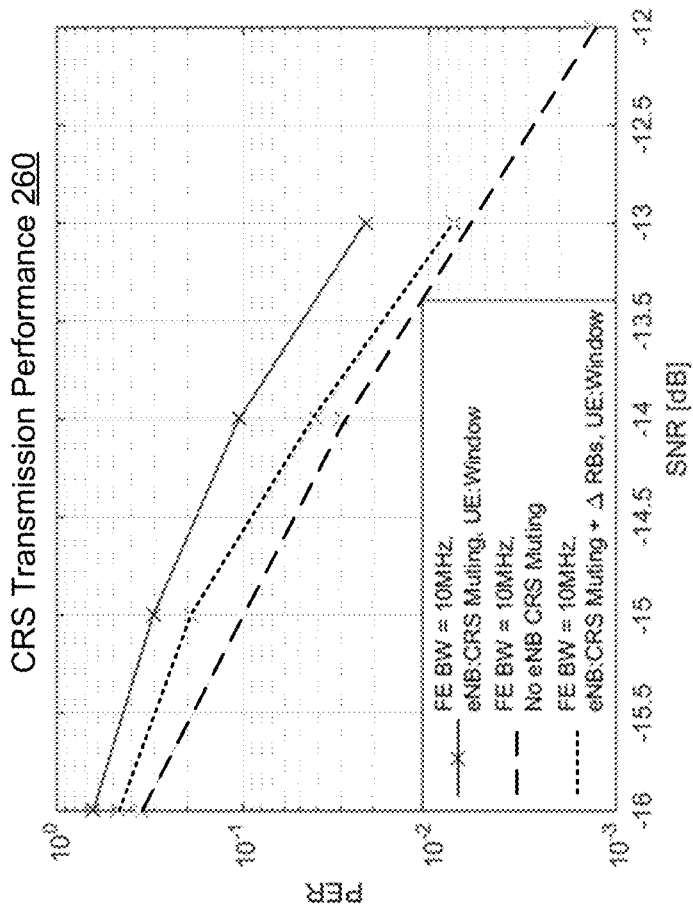
FIG. 2G is a graphical diagram of the CRS transmission performance along multiple bandwidths with and/or without CRS muting and/or windowing.

FIG. 2G is a graphical diagram of the CRS transmission performance 260 along multiple bandwidths with and/or without CRS muting and/or windowing. In particular, even with the application of windowing at the UE, if the network does not deploy CRS muting, performance may be improved by an additional 1.0 dB if the UE can use the full system bandwidth while also having knowledge of the CRS muting. So, there may be a need for the UE to detect if the network entity is performing CRS muting or not.

Figure 2H:
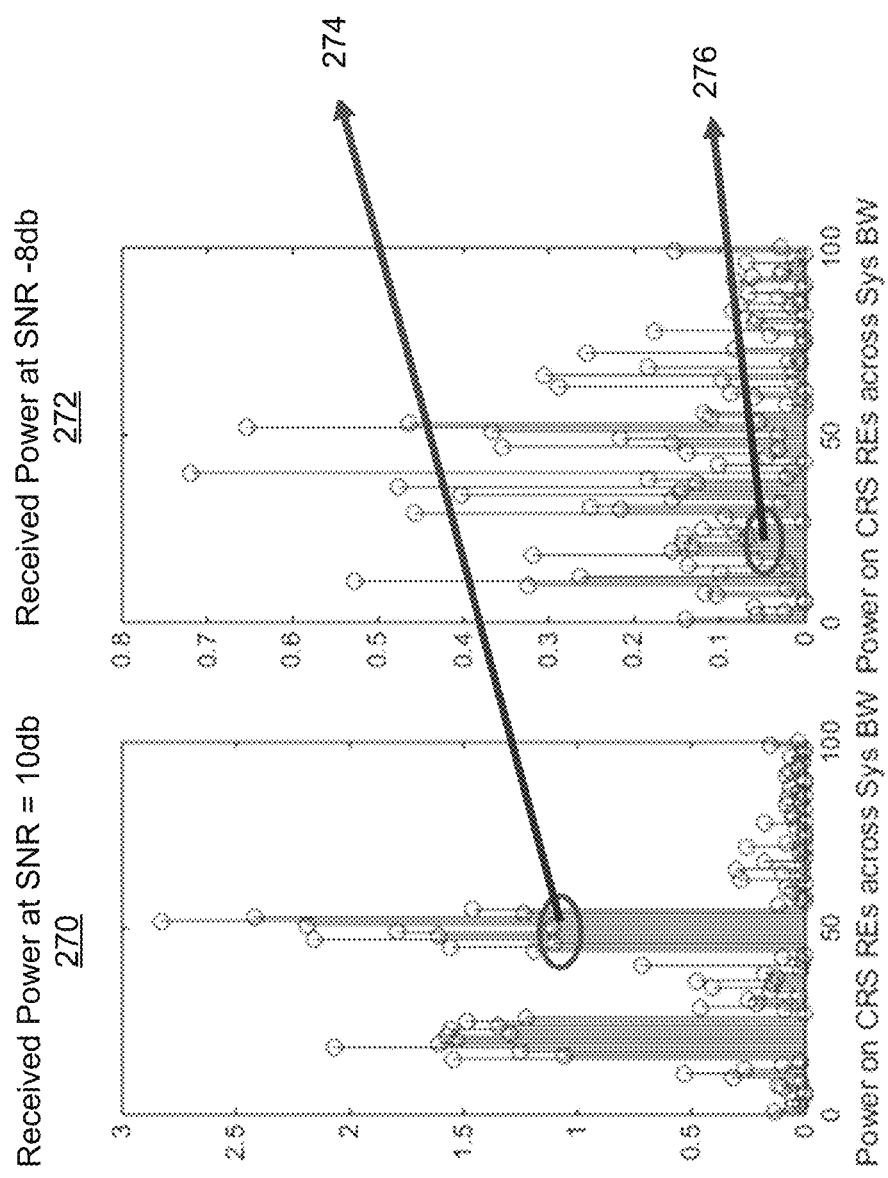
FIG. 2H is a graphical diagram of an aspect of reduced CRS detection.

FIG. 2H is a graphical diagram of an aspect of reduced CRS detection. Detection may be challenging at very low signal-to-noise ratios if the UE relies solely on energy measurements on each narrow band. For instance, the power on the CRS resource elements across the system bandwidth is shown when the signal-to-noise ratio is 10 dB 270. Specifically, location 274 demonstrates that at high signal-to-noise ratios, energy based detections may readily indicate CRS muting. However, at very low signal-to-noise ratios, an energy level may nearly be the same on all narrow bands and may not be used for detection, as shown at location 276 for the received power at a signal-to-noise ratio value of −8 dB 272.

Figure 2I:
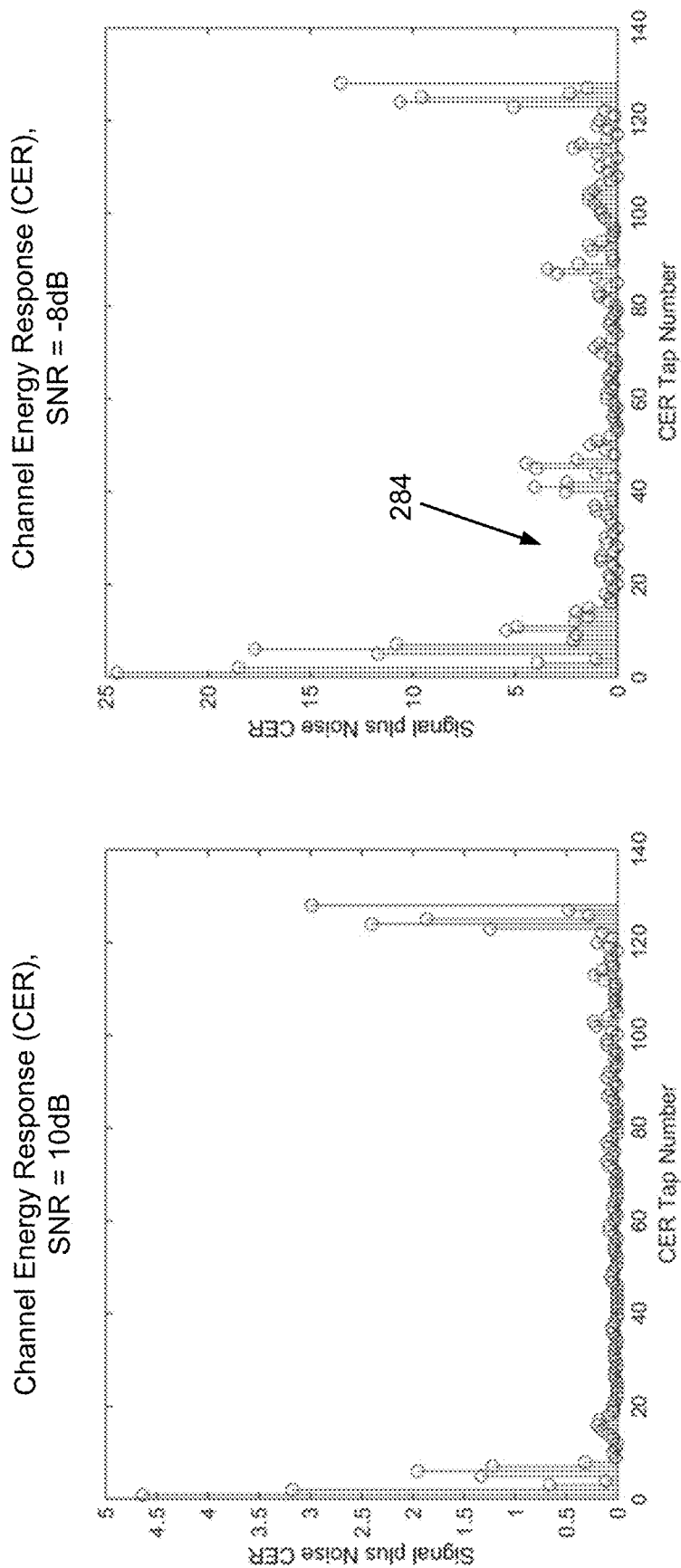
FIG. 2I is a graphical diagram of an aspect of CRS muting detection.

FIG. 2I is a graphical diagram of an aspect of CRS muting detection. At low signal-to-noise ratios, the energy based detection in the frequency domain may be poor. Conversely, the signal and noise energy may be readily differentiated from the channel energy response (CER) in a lag (e.g., time) domain due to the CRS processing gain. For example, at location 284, even at low signal-to-noise ratios, the CER may be fairly clean and may be detectable.

In one aspect of detecting CRS muting, instead of applying the receive window only on the narrow band of interest and the central six resource blocks, the UE may perform the lag domain processing for all other narrow bands to detect if CRS muting is applied or not. The detection may be based on a lag domain signal-to-noise ratio metric. In some aspects, the metric may be determined according to:

$$SNR_{TD} = \text{sum(Highest } N \text{ Terms from CER)/average (Lowest } M \text{ Terms from CER)}$$

If the metric ($SNR_{TD}$) satisfies a threshold (e.g., is less than or equal to), the UE may determine that the CRS is muted and may apply a filter to zero out the noise from the narrow band. If the metric ($SNR_{TD}$) does not satisfy the threshold, the UE may nonetheless consider the narrow band for CRS processing. In some aspects, the metric ($SNR_{TD}$) may be modified to suit the application of the receive window.

In another aspect, the previous aspect of detecting CRS muting may be difficult for UE implementation due to complexity. The UE may have to compute multiple lag domain CERs (e.g., for 10 MHz, there may be 8 narrow bands of interest). Alternatively, the UE may determine (e.g., semi-statically) if the network is deploying reduced CRS or not. For example, if the UE determines that there is no CRS muting, then the UE may not employ any windowing on the receive side. However, if the UE determines that there is CRS muting, then the UE may employ windowing only on the narrow band of interest and the central six resource blocks.

Specifically, to detect CRS muting according to this aspect (e.g., semi-statically), the UE may determine a signal-to-noise ratio metric ($SNR_{TD\_Window}$) over the entire system bandwidth, yet without windowing. The UE may additionally determine a similar metric ($SNR_{TD\_Window}$) with windowing and over the entire system bandwidth. The UE may then compare an overall metric ($SNR_{TD_{Window}} - SNR_{TD_{NoWindow}}$) against a threshold. If the overall metric satisfies (e.g., is greater than or equal to) the threshold, the UE may determine that CRS muting exists. However, if the overall metric does not satisfy (e.g., is less than or equal to) the threshold, the UE may determine that CRS muting does not exist. The forgoing procedure may not run on all the system frames (SFs). For example, the forgoing procedure may be performed just after network acquisition and/or cell reselection/handovers. Also, the forgoing procedure may be repeated once every "P" milliseconds, where "P" may be a whole number.

Figure 3:
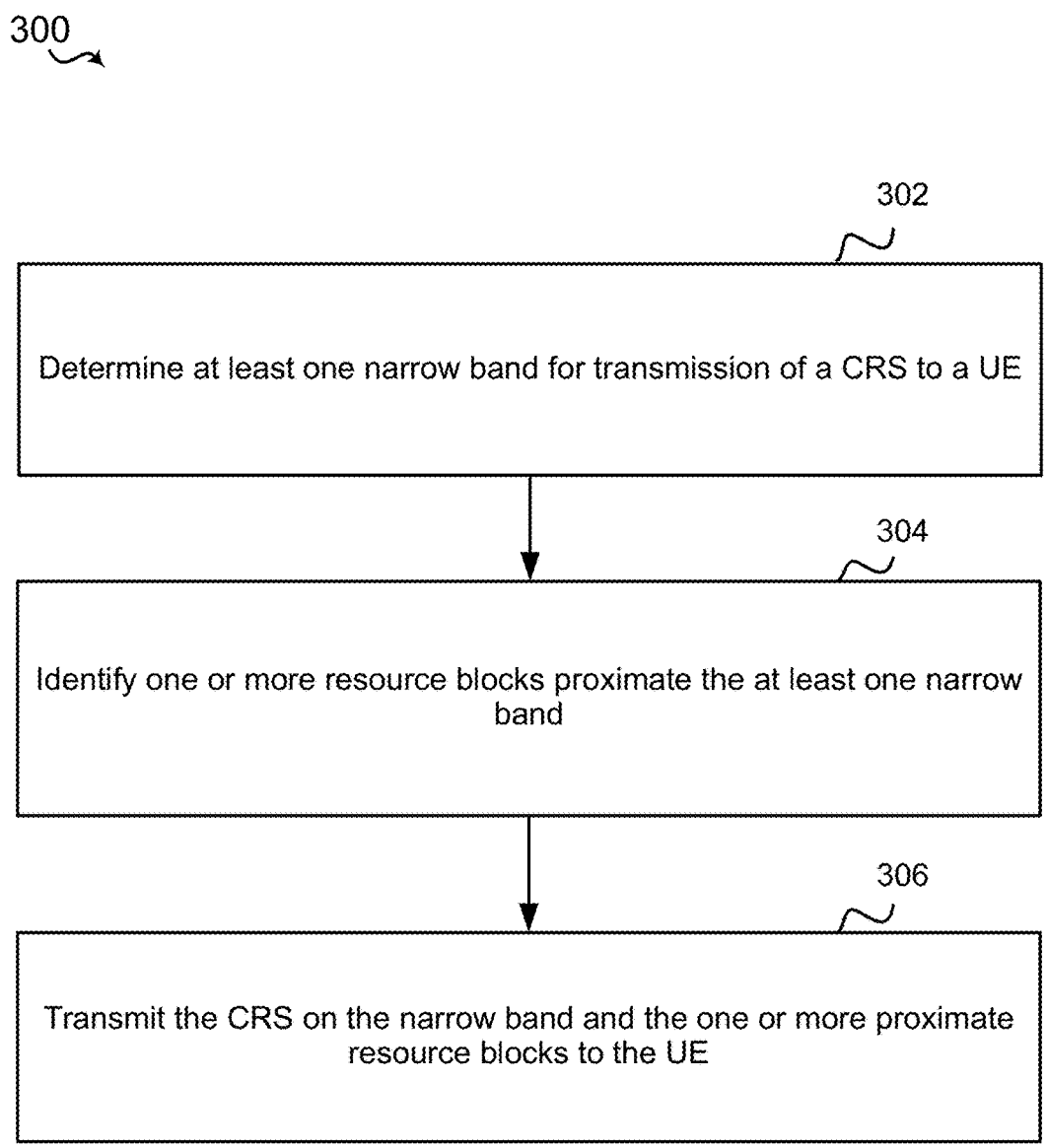
FIG. 3 is a flow diagram of an example of a method of wireless communication at a network entity.

Referring to FIG. 3, for example, a method 300 of wireless communication in operating a network entity such as base station 105 according to the above-described aspects to provide an extended narrow band for CRS transmissions in an eMTC environment includes one or more of the herein-defined actions.

At block 302, the method 300 may determine at least one narrow band for transmission of a CRS to a UE. For example, in an aspect, base station 105 may execute narrow band extension component 170 to determine at least one narrow band 172 for transmission of a CRS 172 to a UE 110. In some aspects, the at least one narrow band 172 may correspond to a defined number of resource blocks allocated for CRS 172 transmission.

At block 304, the method 300 may identify one or more resource blocks proximate to the at least one narrow band. For example, in an aspect, base station 105 may execute narrow band extension component 170 to identify one or more resource blocks proximate to the at least one narrow band 172. In some aspects, the one or more proximate resource blocks may be adjacent to the defined number of resource blocks forming the narrow band 172. In some aspects, the one or more proximate resource blocks may be adjacent to the defined number of resource blocks on at least one side of the at least one narrow band 172. In some aspects, the narrow band 172 can be expanded to have resource blocks in the front, back, or both with respect to the narrow band 172. In some aspects, a size of the one or more proximate resource blocks may be based on a size of the narrow band 172 and/or a power factor associated with the narrow band 172 transmission.

At block 306, the method 300 may transmit the CRS on the at least one narrow band and the one or more proximate resource blocks to the UE. For example, in an aspect, base station 105 may execute modem 160 to transmit the CRS 174 on the at least one narrow band 172 and the one or more proximate resource blocks to the UE 110 on a downlink channel.

Figure 4:
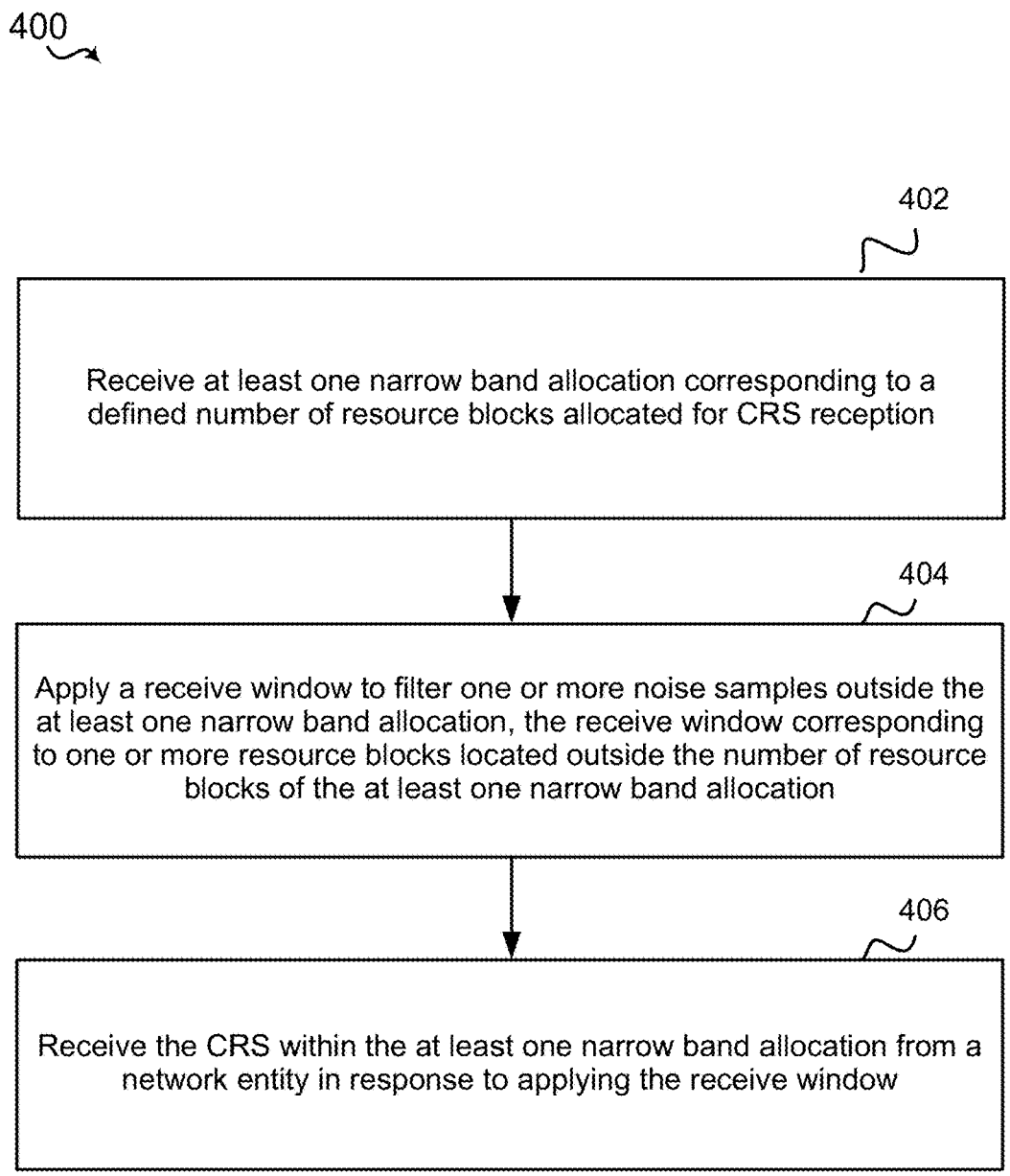
FIG. 4 is a flow diagram of an example of a method of wireless communication at a UE.

Referring to FIG. 4, for example, a method 400 of wireless communication in operating UE 110 according to the above-described aspects to apply a receive window 152 in order to filter noise samples from outside the narrow band 172 includes one or more of the herein-defined actions.

At block 402, the method 400 may receive at least one narrow band allocation corresponding to a defined number of resource blocks allocated for CRS reception. For example, the UE 110 and/or modem 140 may execute narrow band component 150 to receive at least one narrow band 172 allocation corresponding to a defined number of resource blocks allocated for CRS 174 reception. In some aspects, the at least one narrow band 172 allocation may include a narrow band having a defined number of resource blocks and one or more proximate resource blocks allocated by the network entity as described above with respect to FIG. 2. In some aspects, the one or more proximate resource blocks may be adjacent to the define number of resource blocks on at least one side of the narrow band 172.

At block 404, the method 400 may apply a receive window to filter one or more noise samples outside the at least one narrow band allocation, the receive window corresponding to one or more resource blocks located outside the number of resource blocks of the at least one narrow band allocation. For instance, the UE 110 and/or modem 140 may execute narrow band component 150 to apply a receive window 152 to filter one or more noise samples outside the at least one narrow band 172 allocation, the receive window 152 corresponding to one or more resource blocks located outside the number of resource blocks of the at least one narrow band 172 allocation. In some aspects, applying the receive window 152 to filter the one or more noise samples outside the at least one narrow band allocation may include applying the receive window 152 to a central number of resource blocks in addition to the at least one narrow band 172 allocation.

At block 406, the method 400 may detect the CRS within the at least one narrow band allocation from a network entity in response to applying the receive window. For example, the UE 110 and/or modem 140 may execute narrow band component 150 to detect the CRS 174 within the at least one narrow band 172 allocation from a network entity in response to applying the receive window 152.

In some aspects, although not shown, method 400 may determine, via the narrow band component 150, a quality metric for one or more narrow bands over an entire bandwidth and not including the at least one narrow band allocation, determine, via the narrow band component 150, whether the quality metric satisfies a quality metric threshold, apply, via the narrow band component 150, a filter to zero out and/or reduce one or more noise samples from the at least one narrow band allocation based on determining that the quality metric satisfies a quality metric threshold, and identify, via the narrow band component 150, the at least one narrow band allocation for CRS determination based on determining that the quality metric does not satisfy a quality metric threshold.

In some aspects, the quality metric may correspond to a signal-to-noise ratio metric and is associated with a time domain. In some aspects, identifying the at least one narrow band allocation for CRS determination may include forgoing application of the filter to zero out the one or more noise samples from the at least one narrow band allocation.

In some aspects, although not shown, method 400 may determine, via the narrow band component 150, a first quality metric for one or more narrow bands over an entire bandwidth and not including the at least one narrow band allocation, determine, via the narrow band component 150, a second quality metric for the one or more narrow bands over the entire bandwidth, the first and second quality metrics associated with a time domain, determine, via the narrow band component 150, whether the first quality metric and the second quality metric satisfy a quality metric threshold, indicating CRS muting based on determining that the first quality metric and the second quality metric satisfy the quality metric threshold, and indicate, via the narrow band component 150, a lack of CRS muting based on determining that the first quality metric and the second quality metric do not satisfy the quality metric threshold.

In some aspects, the first quality metric may be determined without applying the receive window over the entire bandwidth and the second quality metric may be determined by applying the receive window over the entire bandwidth. In some aspects, although not shown, method 400 may further perform selection or reselection of the network entity, where the first quality metric and the second quality metric are determined after performing selection or reselection of the network entity.

Figure 5:
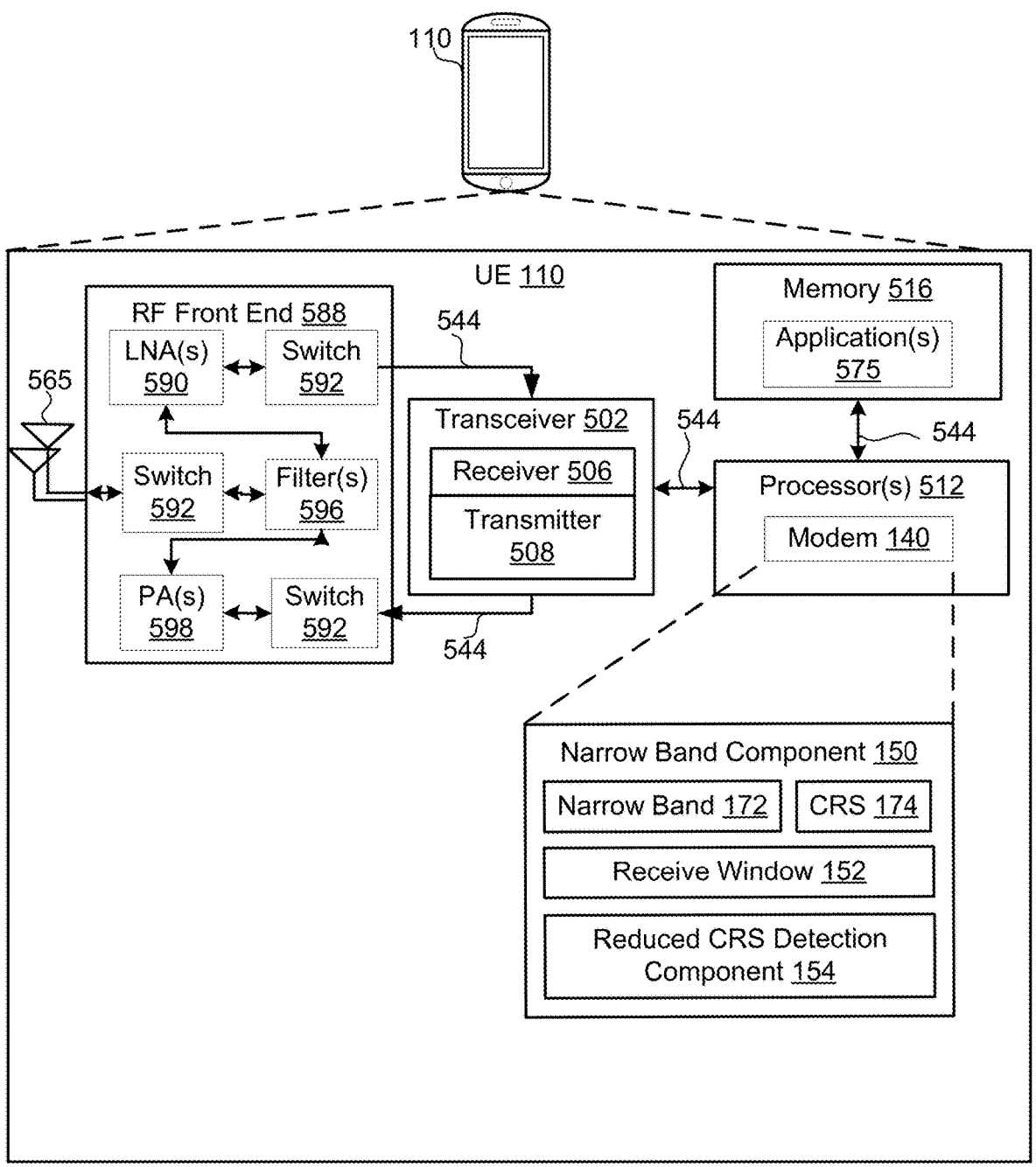
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and narrow band component 150 as described herein. Further, the one or more processors 512, modem 514, memory 516, transceiver 502, radio frequency (RF) front end 588 and one or more antennas 565, may be configured to support voice and/or data calls (simultaneously or non-simultaneously) in one or more radio access technologies. In some aspects, the modem 514 may be the same as or similar to the modem 140.

In an aspect, the one or more processors 512 can include a modem 514 that uses one or more modem processors. The various functions related to resource identification component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with resource identification component 150 may be performed by transceiver 502.

Also, memory 516 may be configured to store data used herein and/or local versions of applications 575 or resource identification component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining resource identification component 150 and/or one or more of its subcomponents, and/or data associated therewith, when UE 110 is operating at least one processor 512 to execute resource identification component 150 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a RF receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 125 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
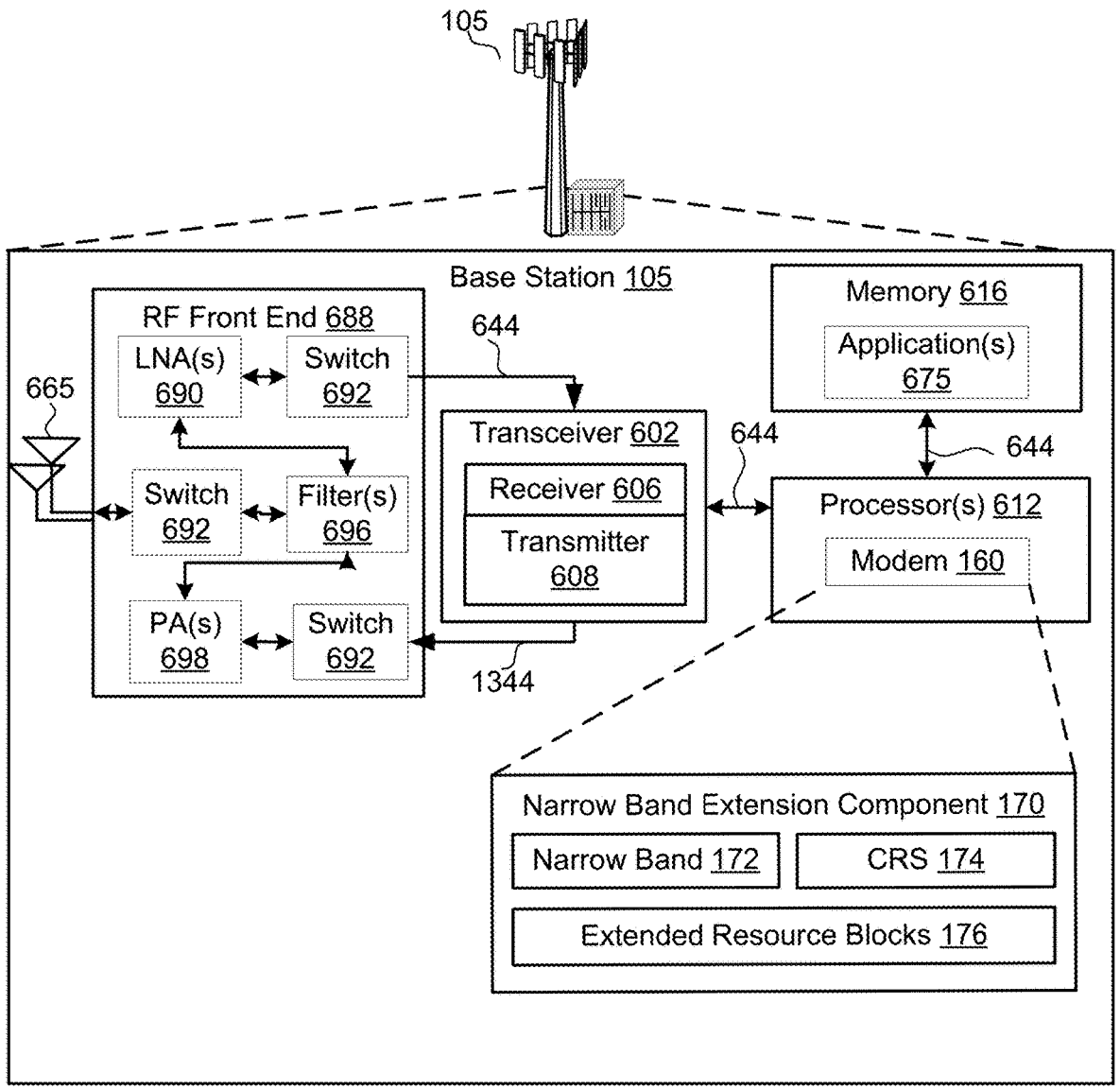
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and narrow band extension component 170 to enable one or more of the functions described herein.

The transceiver 602, receiver 606, transmitter 608, one or more processors 612, memory 616, applications 1375, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method wireless communications at a user equipment, comprising:
   receiving at least one narrow band allocation corresponding to a number of resource blocks allocated for cell-specific reference signal (CRS) reception;
   applying a receive window to filter one or more noise samples outside the at least one narrow band allocation, the receive window corresponding to one or more resource blocks located outside the defined number of resource blocks of the at least one narrow band allocation; and
   receiving the CRS within the at least one narrow band allocation from a network entity in response to applying the receive window.

2. The method of claim 1, wherein the at least one narrow band allocation includes a narrow band having a defined number of resource blocks and one or more proximate resource blocks allocated by the network entity.

3. The method of claim 2, wherein the one or more proximate resource blocks are adjacent to the define number of resource blocks on at least one side of the narrow band.

4. The method of claim 1, wherein applying the receive window to filter the one or more noise samples outside the at least one narrow band allocation includes applying the receive window to a central number of resource blocks in addition to the at least one narrow band allocation.

5. The method of claim 1, further comprising:
   determining a quality metric for one or more narrow bands over an entire bandwidth and not including the at least one narrow band allocation;
   determining whether the quality metric satisfies a quality metric threshold;
   applying a filter to zero out one or more noise samples from the at least one narrow band allocation based on determining that the quality metric satisfies a quality metric threshold; and
   identifying the at least one narrow band allocation for CRS determination based on determining that the quality metric does not satisfy a quality metric threshold.

6. The method of claim 5, wherein the quality metric corresponds to a signal-to-noise ratio metric and is associated with a time domain.

7. The method of claim 5, wherein identifying the at least one narrow band allocation for CRS determination includes forgoing application of the filter to zero out the one or more noise samples from the at least one narrow band allocation.

8. The method of claim 1, further comprising:
   determining a first quality metric for one or more narrow bands over an entire bandwidth and not including the at least one narrow band allocation;
   determining a second quality metric for the one or more narrow bands over the entire bandwidth, the first and second quality metrics associated with a time domain;
   determining whether the first quality metric and the second quality metric satisfy a quality metric threshold;
   indicating CRS muting based on determining that the first quality metric and the second quality metric satisfy the quality metric threshold; and
   indicating a lack of CRS muting based on determining that the first quality metric and the second quality metric do not satisfy the quality metric threshold.

9. The method of claim 8, wherein the first quality metric is determined without applying the receive window over the entire bandwidth and the second quality metric is determined by applying the receive window over the entire bandwidth.

10. The method of claim 8, further comprising performing selection or reselection of the network entity,
wherein the first quality metric and the second quality metric are determined after performing selection or reselection of the network entity.

11. A user equipment, comprising:
a memory; and
at least one processor in communication with the memory and configured to:
receive at least one narrow band allocation corresponding to a number of resource blocks allocated for cell-specific reference signal (CRS) reception;
apply a receive window to filter one or more noise samples outside the at least one narrow band allocation, the receive window corresponding to one or more resource blocks located outside the defined number of resource blocks of the at least one narrow band allocation; and
receive the CRS within the at least one narrow band allocation from a network entity in response to applying the receive window.

12. The user equipment of claim 11, wherein the at least one narrow band allocation includes a narrow band having a defined number of resource blocks and one or more proximate resource blocks allocated by the network entity.

13. The user equipment of claim 12, wherein the one or more proximate resource blocks are adjacent to the define number of resource blocks on at least one side of the narrow band.

14. The user equipment of claim 11, wherein to apply the receive window to filter the one or more noise samples outside the at least one narrow band allocation, the at least one processor is further configured to apply the receive window to a central number of resource blocks in addition to the at least one narrow band allocation.

15. The user equipment of claim 11, wherein the at least one processor is further configured to:
determine a quality metric for one or more narrow bands over an entire bandwidth and not including the at least one narrow band allocation;
determine whether the quality metric satisfies a quality metric threshold;
apply a filter to zero out one or more noise samples from the at least one narrow band allocation based on determining that the quality metric satisfies a quality metric threshold; and
identify the at least one narrow band allocation for CRS determination based on determining that the quality metric does not satisfy a quality metric threshold.

16. The user equipment of claim 15, wherein the quality metric corresponds to a signal-to-noise ratio metric and is associated with a time domain.

17. The user equipment of claim 15, wherein to identify the at least one narrow band allocation for CRS determination, the at least one processor is further configured to forgo application of the filter to zero out the one or more noise samples from the at least one narrow band allocation.

18. The user equipment of claim 11, wherein the at least one processor is further configured to:
determine a first quality metric for one or more narrow bands over an entire bandwidth and not including the at least one narrow band allocation;
determine a second quality metric for the one or more narrow bands over the entire bandwidth, the first and second quality metrics associated with a time domain;
determine whether the first quality metric and the second quality metric satisfy a quality metric threshold;

indicate CRS muting based on determining that the first quality metric and the second quality metric satisfy the quality metric threshold; and
indicate a lack of CRS muting based on determining that the first quality metric and the second quality metric do not satisfy the quality metric threshold.

19. The user equipment of claim 18, wherein the first quality metric is determined without applying the receive window over the entire bandwidth and the second quality metric is determined by applying the receive window over the entire bandwidth.

20. The user equipment of claim 18, wherein the at least one processor is further configured to perform selection or reselection of the network entity,
wherein the first quality metric and the second quality metric are determined after performing selection or reselection of the network entity.

21. An apparatus for wireless communications, comprising:
means for receiving at least one narrow band allocation corresponding to a number of resource blocks allocated for cell-specific reference signal (CRS) reception;
means for applying a receive window to filter one or more noise samples outside the at least one narrow band allocation, the receive window corresponding to one or more resource blocks located outside the defined number of resource blocks of the at least one narrow band allocation; and
means for receiving the CRS within the at least one narrow band allocation from a network entity in response to applying the receive window.

22. The apparatus of claim 21, wherein the at least one narrow band allocation includes a narrow band having a defined number of resource blocks and one or more proximate resource blocks allocated by the network entity.

23. The apparatus of claim 21, wherein the means for applying the receive window to filter the one or more noise samples outside the at least one narrow band allocation includes applying the receive window to a central number of resource blocks in addition to the at least one narrow band allocation.

24. The apparatus of claim 21, further comprising:
means for determining a quality metric for one or more narrow bands over an entire bandwidth and not including the at least one narrow band allocation;
means for determining whether the quality metric satisfies a quality metric threshold;
means for applying a filter to zero out one or more noise samples from the at least one narrow band allocation based on determining that the quality metric satisfies a quality metric threshold; and
means for identifying the at least one narrow band allocation for CRS determination based on determining that the quality metric does not satisfy a quality metric threshold.

25. The apparatus of claim 21, further comprising:
means for determining a first quality metric for one or more narrow bands over an entire bandwidth and not including the at least one narrow band allocation;
means for determining a second quality metric for the one or more narrow bands over the entire bandwidth, the first and second quality metrics associated with a time domain;
means for determining whether the first quality metric and the second quality metric satisfy a quality metric threshold;

means for indicating CRS muting based on determining that the first quality metric and the second quality metric satisfy the quality metric threshold; and means for indicating a lack of CRS muting based on determining that the first quality metric and the second quality metric do not satisfy the quality metric threshold.

26. An non-transitory computer-readable medium storing computer code executable by a processor for wireless communications, comprising code for:
   receiving at least one narrow band allocation corresponding to a number of resource blocks allocated for cell-specific reference signal (CRS) reception;
   applying a receive window to filter one or more noise samples outside the at least one narrow band allocation, the receive window corresponding to one or more resource blocks located outside the defined number of resource blocks of the at least one narrow band allocation; and
   receiving the CRS within the at least one narrow band allocation from a network entity in response to applying the receive window.

27. The non-transitory computer-readable medium of claim 26, wherein the at least one narrow band allocation includes a narrow band having a defined number of resource blocks and one or more proximate resource blocks allocated by the network entity.

28. The non-transitory computer-readable medium of claim 26, wherein applying the receive window to filter the one or more noise samples outside the at least one narrow band allocation includes applying the receive window to a central number of resource blocks in addition to the at least one narrow band allocation.

29. The non-transitory computer-readable medium of claim 26, further comprising code for:
   determining a quality metric for one or more narrow bands over an entire bandwidth and not including the at least one narrow band allocation;
   determining whether the quality metric satisfies a quality metric threshold;
   applying a filter to zero out one or more noise samples from the at least one narrow band allocation based on determining that the quality metric satisfies a quality metric threshold; and
   identifying the at least one narrow band allocation for CRS determination based on determining that the quality metric does not satisfy a quality metric threshold.

30. The non-transitory computer-readable medium of claim 26, further comprising code for:
   determining a first quality metric for one or more narrow bands over an entire bandwidth and not including the at least one narrow band allocation;
   determining a second quality metric for the one or more narrow bands over the entire bandwidth, the first and second quality metrics associated with a time domain;
   determining whether the first quality metric and the second quality metric satisfy a quality metric threshold;
   indicating CRS muting based on determining that the first quality metric and the second quality metric satisfy the quality metric threshold; and
   indicating a lack of CRS muting based on determining that the first quality metric and the second quality metric do not satisfy the quality metric threshold.

* * * * *